United States Patent

[11] 3,628,080

[72] Inventor Per T. Lindeqvist
 Elmira, N.Y.
[21] Appl. No. 848,668
[22] Filed Aug. 8, 1969
[45] Patented Dec. 14, 1971
[73] Assignee Westinghouse Electric Corporation
 Pittsburgh, Pa.

[54] FIBER OPTIC OUTPUT FACEPLATE ASSEMBLY SYSTEM
 7 Claims, 2 Drawing Figs.

[52] U.S. Cl. ................................................. 315/9,
 250/213, 313/3, 313/65, 313/92 L F, 315/10
[51] Int. Cl. ....................................................... H01j 29/46,
 H01j 31/26
[50] Field of Search ............................................. 313/3, 65,
 65 LF, 92 LF; 315/9, 10; 250/213

[56] References Cited
UNITED STATES PATENTS

| | | | |
|---|---|---|---|
| 3,058,021 | 10/1962 | Dunn............................ | 313/65 |
| 3,424,932 | 1/1969 | Sheldon....................... | 313/3 X |

Primary Examiner—Roy Lake
Assistant Examiner—V. Lafranchi
Attorneys—F. H. Henson and C. F. Renz ABSTRACT: A fiber optic faceplate for an electron tube in which an electron sensitive phosphor is provided on the inner surface of the faceplate and the light image from the phosphor is viewed or coupled through the fiber optic faceplate to an image intensifier. By providing an electrical conductive coating on the outer surface of the fiber optic faceplate, an improved fiber optic faceplate assembly is provided.

Patented Dec. 14, 1971 3,628,080

WITNESSES:
Alfred G. Colaizzi
Leon M. Garman

INVENTOR
Per T. Lindeqvist

Charles F. Renz
ATTORNEY

FIBER OPTIC OUTPUT FACEPLATE ASSEMBLY SYSTEM

BACKGROUND OF THE INVENTION

This invention relates to fiber optic faceplate assemblies for utilization in electron beam tubes. The utilization of fiber optic windows in cathode ray tubes, image intensifiers and camera tubes has provided improved resolution by providing optical coupling between light emitting surfaces and light responsive surfaces. One particular application of fiber optic faceplate utilization is that in providing an image intensifier which is in turn optically coupled to a camera tube such as a secondary electron conduction type. In this type of structure, an input window to the image intensifier is provided with a light sensitive photoemissive layer on the inner surface. An output phosphor responsive to the electron image from the photoemissive layer is provided on the inner surface of a fiber optic output window located at the opposite end of the intensifier. The normal electron acceleration between the photoemissive layer and the phosphor is about 15 kilovolts. The output of the image intensifier may be optically coupled to the input fiber optic window of an secondary electron conduction (SEC) camera tube by simply positioning the output fiber optic window of the image intensifier adjacent the input window to the SEC camera tube. The SEC Camera tube is provided with a light responsive photosurface on the inner surface of the input fiber optic window which is responsive to the light emission from the output phosphor of the image intensifier. The electrons emitted from the photosensitive cathode of the SEC camera tube may be accelerated by a potential of about 8 kilovolts to a storage target to impress a charge storage image corresponding to the input to the image intensifier. This storage image on the target of the SEC camera tube may be read out from the opposite side by a scanning electron beam.

Any imaging system utilizing stacked fiber optic tubes, such as described above, must provide for the voltage problem created by the joining of the fiber optic surfaces between the output fiber optic window of the image intensifier and the fiber optic input window of the SEC camera tube. The total voltage from the input photocathode of the image intensifier to the output target of the SEC camera tube is the sum of the operating voltages of each tube and thus in the specific example mentioned would be 15 kilovolts plus 8 kilovolts or a total of 23 kilovolts. This amount of voltage would permit the output phosphor to be at the same potential as the photosurface on the SEC camera tube. By utilizing an insulating fiber optic plug between the fiber optic output window of the image intensifier and the fiber optic input window of the SEC camera tube, one is able to modify the potential on the photocathode of the SEC camera so that the total voltage required from a power supply for the system would amount to 15 kilovolts rather than 23 kilovolts. For example, the input photocathode of the image intensifier could operate at a negative 15 kilovolts with the phosphor output of the image intensifier at ground and the photocathode of the SEC camera tube operating at a negative 8 kilovolts and the target electrode at ground. The utilization of the insulating plug provides the necessary dielectric breakdown strength between these two voltages on the output phosphor of the intensifier and the photocathode of the SEC camera tube. It has been found, particularly in the low level illumination of the image intensifier, that a dark slowly disappearing pattern is evident when the system is turned on. The elapsed time before this dark pattern disappears from the system depends on the light level and in some cases may last as long 15 to 30 minutes.

It is accordingly the general object of this invention to eliminate this undesired pattern from the imaging system.

SUMMARY OF THE INVENTION

A fiber optic window for an electron device in which a phosphor screen with conductive backing is provided on the inner surface of the fiber optic window and is maintained at a fixed potential and an electrically conductive coating is provided adjacent the outer surface of the fiber optic window and is maintained at substantially the same potential as the fixed potential on the phosphor screen.

DESCRIPTION OF THE PREFERRED EMBODIMENT

Figure 1:
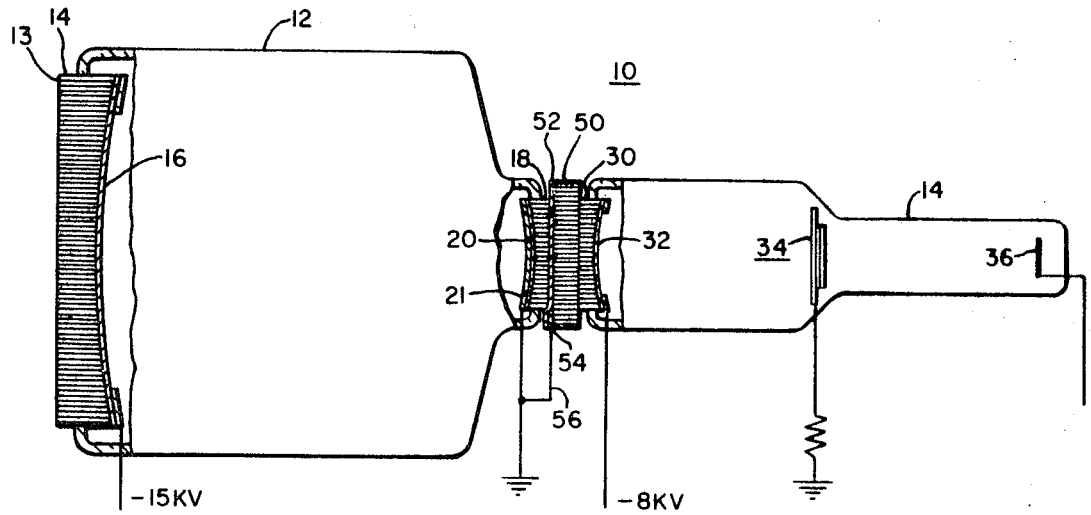
FIG. 1 is a schematic showing of an image system incorporating the teachings of the invention.

Referring to FIG. 1, an imaging system 10 is shown comprised of an image intensifier tube 12 and a camera tube 14 optically coupled together. The image intensifier tube 12 includes a fiber optic input window 14 having a photoemissive surface 16 responsive to input radiations. The window 14 is comprised of a plurality of glass fibers 13. The fibers normally consist of at least a core portion of high refractive index glass with a coating of low refractive index glass. The fibers are binded together and bonded to provide a vacuum light window. The image intensifier 12 also includes an output fiber optic window 18 having an output phosphor 20 thereon an electrical conductive coating 21 is normally provided of the surface of the phosphor 20. The photocathode 16 operates at a potential of about a negative 15 kilovolts and the output phosphor 20 through the coating 21 is connected to ground potential. The electrons emitted in response to input radiation from the photocathode 16 are accelerated and directed onto the output phosphor 20 giving an intensified light image corresponding to the input radiation.

The camera tube 14 may be of the SEC type described in U.S. Pat. No. 3,213,316 and consists of an input fiber optic window 30 having a photocathode 32 thereon, The photocathode 32 is operated at a potential of about a negative 8 kilovolts and the electron image emitted from the photocathode 32 is focused onto a storage target 34 to provide a charge image. This stored image may be read out by means of an electron gun 36 illustrated a cathode. The signal derived from the target 34 in response to read out by scanning the electron beam from the gun 36 is connected to a suitable display device. The target structure 34 operates at substantially ground potential.

Figure 2:
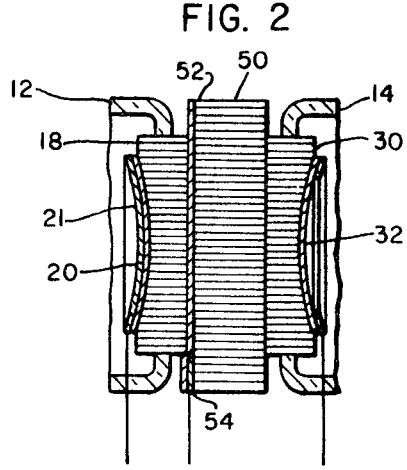
FIG. 2 is an enlarged sectional view of the fiber optic coupling in FIG. 1.

Positioned between the fiber optic input window 30 and the output fiber optic window 18 is a fiber optic plug 50. This structure is shown in a more detail in FIG. 2. In the specific embodiment, the thickness of the fiber optic window 18 near the center region may be about one quarter of an inch and the fiber optic window 30 might also have a similar thickness. The fiber optic plug 50 should have a thickness of about ½inch. In this manner, the light image from the phosphor coating 20 may be optically coupled to the photocathode 32 without any substantial loss in resolution. An electrical conductive coating 52 of a suitable material such as gold is provided on the surface of the fiber optic plug 50 facing the fiber optic window 18. The thickness of the coating 52 is about 10 nanometers which gives about 80 percent transmission of light from the phosphor layer 20 to the photocathode 32. The measured resistance of the coating 52 across the fiber optic plug, which has a diameter of about 2 inches, is about 5,000 to 10,000 ohms. A contact strip 54 is provided on the outer periphery of the plug 50 and this is utilized to provide means of connecting the conductive coating 52 to the same potential source as that connected to the output phosphor 20. It is of course obvious that the conductive coating 52 could be provided directly on the fiber optic window 18 but for convenience in manufacture and assembly the conductive coating 52 is provided on the insert fiber optic plug 50. The fiber optic plug 50 may be secured between the two optic fiber plates 18 and 30 by means of any suitable insulating adhesive material about the periphery. The electrical conductive coating 52 may be of any suitable electrical conductive material such as gold, aluminum or silver. The dark pattern found in previous type structures is completely removed.

Various modifications may be made within the spirit of the invention. 6 I claim as my invention:

1. An electron tube assembly comprising an evacuated envelope and having a fiber optic output window, said fiber optic output window having an electron responsive layer deposited on the inner surface of said fiber optic output window, a first terminal connected to said electron responsive layer, an outer electrically conductive layer provided on the outer surface of said fiber optic output window, a second terminal connected to said outer electrical conductive layer, said first terminal connected to said second terminal.

2. The assembly in claim 1 in which said electron responsive layer is a layer of phosphor which emits light in response to electron bombardment and in which an inner electrically conductive coating is provided over the surface of the phosphor layer.

3. The device in claim 2 in which said first and second terminals are connected to the same potential.

4. The assembly in claim 2 in which said outer electrically conductive layer is transmissive to the light emitted by said phosphor layer.

5. An electronic imaging system comprising an image intensifier tube comprising a photocathode and an output phosphor, a first means for operating said output phosphor at a more positive potential than said photocathode, a fiber optic output window on said image intensifier, a camera tube having a fiber optic input window for viewing the output from said image intensifier, a fiber optic spacer member positioned between said output fiber optic window of said image intensifier and said fiber optic input window of said camera tube, said camera tube having a photocathode provide on the inner surface of said input fiber optic window, a second means for operating said photocathode of said camera tube at a negative potential with respect to said output phosphor on said image intensifier and an electrical conductive coating transmissive to the emission from said output phosphor positioned between said fiber optic output window and said fiber optic spacer member.

6. The device in claim 5 in which a third means is provided for operating said electrical conductive coating at potential substantially the same as said output phosphor.

7. The device in claim 6 in which said electrical conductive coating is provided on said fiber optic spacer member.